(12) United States Patent
Lim

(10) Patent No.: US 7,441,793 B1
(45) Date of Patent: Oct. 28, 2008

(54) TOW HITCH LUNETTE ASSEMBLY

(75) Inventor: James G. Lim, Macomb, MI (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 402 days.

(21) Appl. No.: 11/340,008

(22) Filed: Jan. 17, 2006

(51) Int. Cl.
B60D 1/01 (2006.01)

(52) U.S. Cl. .................. 280/504; 280/507; 280/511; 280/506; 280/515; 280/514

(58) Field of Classification Search .................. 280/504, 280/507, 511, 506, 515, 514
See application file for complete search history.

(56) References Cited

U.S. PATENT DOCUMENTS

| | | | |
|---|---|---|---|
| 2,371,071 A | | 3/1945 | Schonitzer |
| 2,483,111 A | * | 9/1949 | Spillman ..................... 411/340 |
| 2,687,899 A | * | 8/1954 | Bendtsen ..................... 280/504 |
| 4,052,085 A | | 10/1977 | Rendessy |
| 4,111,449 A | | 9/1978 | Hancock |
| 4,596,399 A | | 6/1986 | Clark |
| 5,240,266 A | | 8/1993 | Kelley et al. |
| 5,263,745 A | * | 11/1993 | Storey ......................... 280/483 |
| 5,280,940 A | | 1/1994 | Kendall |
| 5,551,539 A | | 9/1996 | Frymiare |
| 5,620,198 A | | 4/1997 | Borchers |
| H1767 H | | 1/1999 | Davis et al. |
| 6,027,134 A | | 2/2000 | Hart et al. |
| 6,357,779 B1 | | 3/2002 | Mok et al. |
| 6,412,314 B1 | * | 7/2002 | Jenks ........................... 70/14 |
| 6,416,073 B1 | * | 7/2002 | Marcy ......................... 280/416.1 |
| 6,588,790 B2 | * | 7/2003 | Hall ............................ 280/513 |
| 6,663,132 B1 | | 12/2003 | Kizy |
| 6,669,223 B2 | | 12/2003 | Sekaria et al. |
| 6,672,609 B2 | * | 1/2004 | Pierman et al. ............. 280/504 |
| 6,769,710 B1 | | 8/2004 | Lim |
| 6,820,889 B1 | | 11/2004 | Anderson |
| 6,834,879 B1 | | 12/2004 | Lorman |
| 6,908,094 B1 | | 6/2005 | Sellers |
| 6,908,097 B2 | | 6/2005 | Roberts |

(Continued)

Primary Examiner—Lesley D. Morris
Assistant Examiner—Marlon A Arce Diaz
(74) Attorney, Agent, or Firm—David L. Kuhn; Thomas W. Saur; Luis Miguel Acosta

(57) ABSTRACT

For use in a vehicular trailer hitch system, a vehicular trailer hitch lunette assembly is provided. The assembly includes at least one "U" shaped outer laminate plate having two legs with a semi-circular region therebetween, and at least one substantially flat inner laminate plate positioned between the legs of the U-shape of the outer laminate plate to provide support, stiffness, and additional mechanical strength to the assembly. The outer laminate plate and the inner laminate plate have cooperating apertures that are traversely positioned therethrough and the apertures are aligned and sized such that fasteners may be snugly inserted therein to mechanically couple the laminate plates together as a sandwich structure having first and second ends. The semi-circular region of the outer laminate plate and ends of the inner laminate plate comprise an inner void at the first end of the assembly to provide a lunette shaped structure to attach to a complimentary hitch assembly that is adapted to receive the lunette shaped structure, and the second end of the assembly is shaped to mate to a corresponding housing.

10 Claims, 3 Drawing Sheets

U.S. PATENT DOCUMENTS

| | | |
|---|---|---|
| 6,908,099 B2 | 6/2005 | Andersen |
| 6,910,705 B1 | 6/2005 | Harwood et al. |
| 6,938,912 B1 * | 9/2005 | Norton et al. ............... 280/507 |
| 6,991,250 B2 * | 1/2006 | Lindsey et al. .............. 280/651 |
| D526,602 S * | 8/2006 | Sparkes .................... D12/162 |
| 7,334,809 B2 * | 2/2008 | Coy ........................... 280/507 |
| 2004/0239073 A1 | 12/2004 | Goettker |
| 2005/0006874 A1 | 1/2005 | Mrofka et al. |
| 2005/0104325 A1 | 5/2005 | Rodgers |

* cited by examiner

TOW HITCH LUNETTE ASSEMBLY

GOVERNMENT INTEREST

The invention described here may be made, used and licensed by and for the U.S. Government for governmental purposes without paying royalty to me.

BACKGROUND OF THE INVENTION

1. Field of the Invention

The present invention generally relates to a tow hitch lunette assembly.

2. Background Art

Tow hitch assemblies are generally implemented in connection with a tow vehicle such as a truck and a towed vehicle such as a trailer and the like. Trailers for construction equipment and other heavy-duty trailers often use a hitch assembly having a lunette eye trailer tongue to provide mechanical coupling between the tow vehicle and the towed vehicle. The lunette tongue can include a rigid, durable, hitch ring or "eye" having a toroidal (i.e., "donut" or lunette) shape. The eye can be placed over or secured to a vertical post or pin, or latched into a pintle, or the like on the tow vehicle.

Referring to FIG. 1, an isometric perspective view of a conventional tow hitch assembly 10 is shown. The tow hitch assembly 10 generally includes a tow hitch lunette assembly 12 and a housing 14. The tow hitch lunette assembly 12 is offset (i.e., "zig-zag", or "Z") shaped to provide proper interface height between a tow vehicle and a towed vehicle having unequal tow point heights.

The tow hitch lunette assembly 12 is generally sized and shaped to slidably fit snugly into the housing 14. The housing 14 has apertures (holes) formed in respective side faces to provide for insertion of retention fasteners 16. The tow hitch lunette assembly 12 is generally mechanically fastened to the housing 14 via a plurality of the through-bolt/nut or pin fasteners 16. Additional components, assemblies, sub-assemblies, etc. such as electrical connectors, switches, surge dampers, and the like (not shown) may also be fastened to the housing 14 via respective holes using any appropriate fasteners (not shown). The tow hitch lunette assembly 12 is generally mechanically fastened to a tow vehicle hitch via an eye (or donut) portion 20. The housing 14 is generally mechanically coupled to the towed vehicle.

To provide adequate strength in an offset configuration, conventional offset tow hitch lunette assemblies such as the assembly 12 are typically made of cast metal (e.g., iron, steel, etc.) that is processed by surface grinding, machining, and drilling. As such, the conventional tow hitch lunette assemblies such as the assembly 12 are heavy and costly to manufacture. In addition, the cast metal in the offset configuration may be prone to fatigue failure.

Thus, there exists a need and an opportunity for an improved tow hitch lunette assembly. Such an improved tow hitch lunette assembly may overcome one or more of the deficiencies of the conventional approaches.

SUMMARY OF THE INVENTION

Accordingly, the present invention may provide an improved tow hitch lunette assembly.

According to the present invention, for use in a vehicular trailer hitch system, a vehicular trailer hitch lunette assembly is provided. The assembly comprises at least one "U" shaped outer laminate plate having two legs with a semi-circular region therebetween, and at least one substantially flat inner laminate plate positioned between the legs of the U-shape of the outer laminate plate to provide support, stiffness, and additional mechanical strength to the assembly.

The outer laminate plate and the inner laminate plate have cooperating apertures that are traversely positioned therethrough and the apertures are aligned and sized such that fasteners may be snugly inserted therein to mechanically couple the laminate plates together as a sandwich structure having first and second ends.

The semi-circular region of the outer laminate plate and ends of the inner laminate plate comprise an inner void at the first end of the assembly to provide a lunette shaped structure to attach to a complimentary hitch assembly that is adapted to receive the lunette shaped structure, and the second end of the assembly is shaped to mate to a corresponding housing.

In one example, at least one of the outer laminate plate and the inner laminate plate is implemented using vanadium steel.

The assembly further comprises a wear plate that is fixed to a surface formed by one set of edges of the outer and inner laminate plates, and the wear plate includes a void accommodation aperture that is sized substantially the same as and is aligned with the void. The wear plate may be implemented using vanadium steel.

The assembly of claim further comprises a "Z" shaped offset to provide accommodation of height variation between a tow vehicle and a towed vehicle.

The second end of the assembly may be substantially rectangularly shaped.

In one example, the assembly further comprises a cylindrically shaped hollow lunette insert that is disposed and fastened within the void and has a respective cylindrical axis parallel to the cylindrical axis of the semi-circular region to provide additional strength and uniformity to the void. The lunette insert may be implemented using vanadium steel.

In one example, the lunette insert has a shaped recess formed in one face of the outer cylindrical surface, and the recess is shaped and positioned to cooperate with a matching one of the apertures to retain the lunette insert within the void.

In another example, the assembly further comprises an arcuate section of a hollow, cylindrically shaped member to form a lunette insert that is disposed and fastened within the void and has a respective cylindrical axis parallel to the cylindrical axis of the semi-circular region and attached to the ends of the inner laminate plates that form the rearward portion of the void to provide additional strength and uniformity to the void. The lunette insert may be implemented using vanadium steel.

The above features, and other features and advantages of the present invention are readily apparent from the following detailed descriptions thereof when taken in connection with the accompanying drawings.

DETAILED DESCRIPTION OF THE PREFERRED EMBODIMENT(S)

With reference to the Figures, the preferred embodiments of the present invention will now be described in detail. Generally, the present invention provides an improved system for a tow hitch lunette assembly for use in connection with a vehicular trailer tow hitch system. The tow hitch lunette assembly of the present invention may be implemented in connection with a tow (generally pull or push) vehicle such as a truck and a towed (generally pulled or pushed) vehicle such as a trailer, and the like. See, for example, U.S. Pat. No. 5,280,940 to Kendall, which is incorporated by reference in its entirety, as an example of the tow vehicle and the towed vehicle environment in which the present invention may be implemented.

Figure 1:
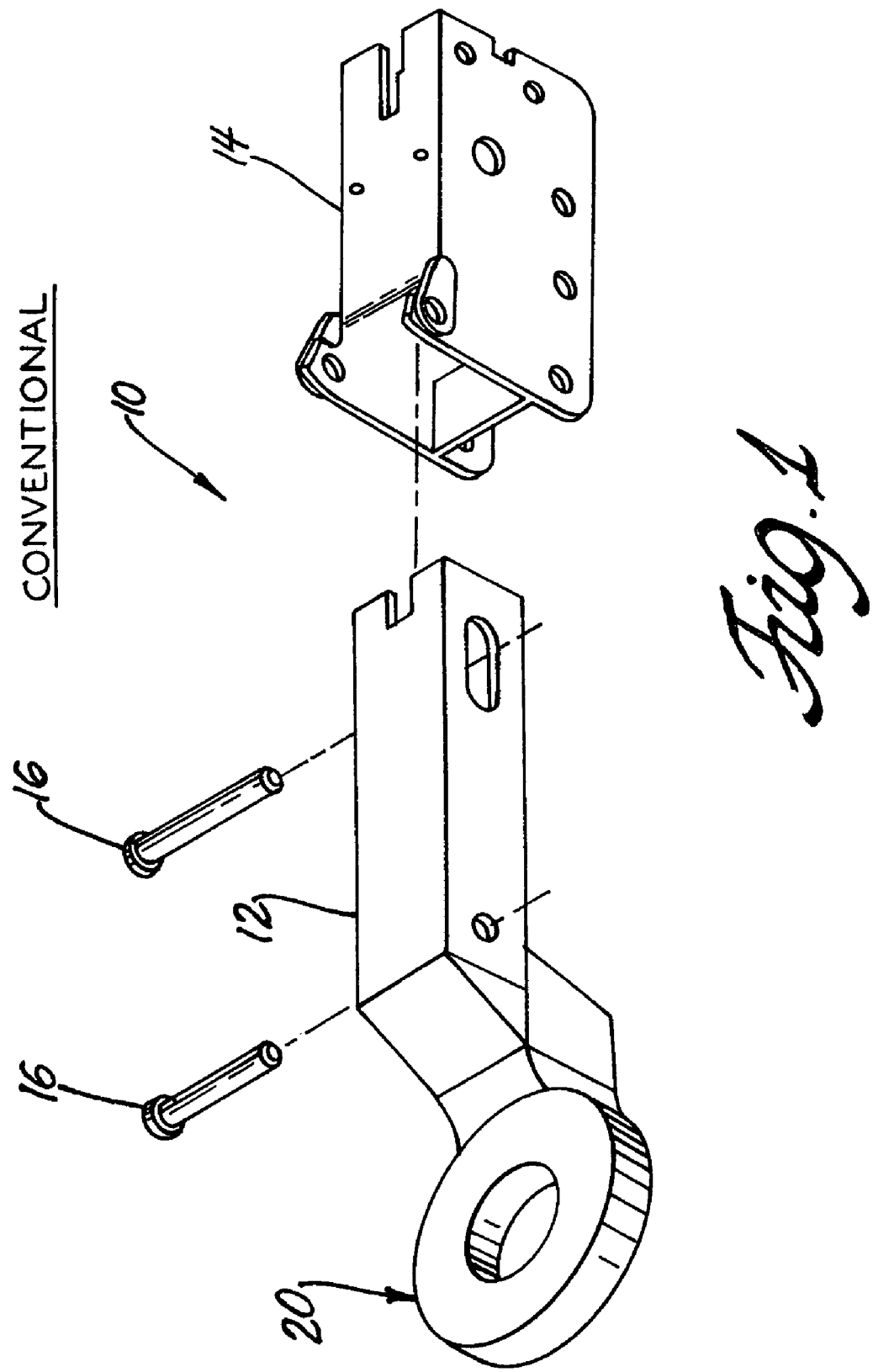
FIG. 1 is an isometric perspective diagram of a conventional tow hitch assembly.
Figure 2:
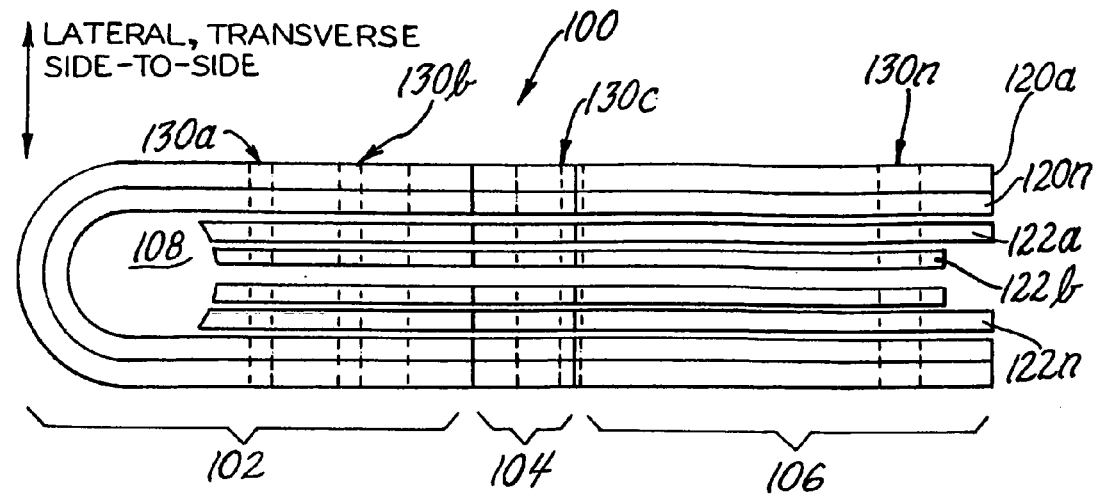
FIG. 2 is a diagram of a top (plan) view of a tow hitch lunette assembly of an implementation of the present invention.
Figure 3:
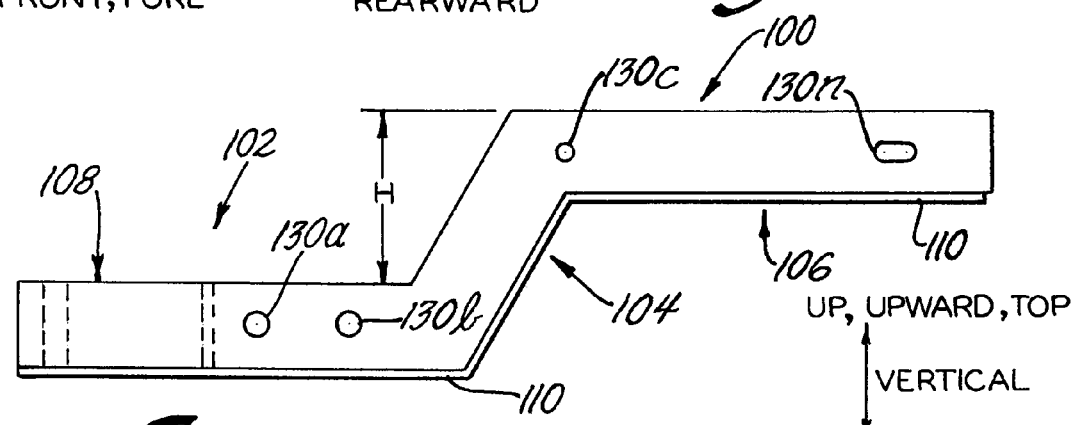
FIG. 3 is a diagram of a side (elevation) view of a tow hitch lunette assembly of an implementation of the present invention.

Referring to FIGS. 2 and 3 in combination, diagrams illustrating a top view (FIG. 2) and side view (FIG. 3) of a vehicular trailer tow hitch lunette assembly 100 of the present invention are shown. The tow hitch lunette assembly (i.e., system, apparatus, device, etc.) 100 is generally implemented in connection with a vehicular trailer tow hitch system that includes a vehicular trailer tow hitch assembly housing or a towed vehicle drawbar. In one example, the tow hitch lunette assembly 100 may be advantageously implemented in connection with a vehicular trailer tow hitch assembly housing similar to the housing 14 of FIG. 1. However, the tow hitch lunette assembly 100 may be implemented in connection with any appropriate tow hitch assembly, drawbar, component(s), sub-assembly(ies), system, sub-system(s), and the like to meet the design criteria of a particular application.

Relative directions (e.g., vertical, longitudinal, etc.) are generally as shown. Lateral (i.e., transverse, left-right, etc.) directions are generally perpendicular to the vertical-longitudinal plane.

In one example, the vehicular trailer hitch tow hitch lunette assembly 100 of the present invention may solve the problem of mismatched equipment hitch heights. The adapter 100 can be used with a trailer or other towed device which has an appropriate housing on the end of (i.e., mechanically coupled to) a towing tongue. The present invention may provide a robust and cost efficient solution for a tow hitch lunette assembly.

In one example, the assembly 100 comprises a laminated structure having a region (i.e., section, portion, etc.) 102 at a first end, a region 104, and a region 106 at a second end. The regions 102, 104 and 106 are generally adjacent (i.e., contiguous) portions of the structure 100. In one example implementation, the section 102 may comprise the fore end of the assembly 100, the section 106 may comprise the aft end of the assembly 106, and the section 104 may comprise a center structure between the sections 102 and 106 at the first and second ends, respectively.

The section 102 is generally implemented as a lunette (i.e., eye) structure having a rounded end (i.e., a substantially semi-circular outer, e.g., foremost, end) that comprises an inner void (e.g., aperture, hole, opening, etc.) 108 such that lunette structure 100 may be used to attach a towed vehicle to a truck or other prime mover having a complimentary (i.e., matching) mounting assembly such as a pintle, boss and pin structure, and the like (not shown) that is generally adapted to receive and hold the lunette eye region 102 of the assembly 100.

The section 104 is generally implemented as an offset (e.g., the offset, H) to provide accommodation of height variation between the tow vehicle and the towed vehicle. In one example, the offset, H, may be "zig-zag" or "Z" shaped. The amount of the offset, H, is generally selected (i.e., predetermined, chosen, etc.) to meet the design criteria of a particular application. In one example (e.g., as shown in FIG. 3), the lunette assembly 100 may be implemented having a "dropped" section 102 via the offset 104 (i.e., the section 102 may be offset from the section 106 by the amount, H, in the downward direction). In another example (not shown), the lunette assembly 100 may be implemented having a "raised" section 102 via the offset 104 (i.e., the section 102 may be offset from the section 106 by the amount, H, in the upward direction).

The section 106 is generally shaped to mate (i.e., install) to a housing (e.g., a corresponding structure) on the vehicle that is to tow the desired piece of equipment, or alternatively, on the towed equipment. In one example (e.g., as shown in FIGS. 2 and 3), the region 106 may be substantially rectangularly shaped. However, the region 106 may have any appropriate shape to interface with any appropriate housing assembly to meet the design criteria of a particular application.

The vehicular trailer tow hitch lunette assembly 100 generally comprises at least one outer laminate plate 120 (e.g., outer laminate plates 120a-120n), and at least one inner laminate plate 122 (e.g., inner laminate plates 122a-122n). The laminate plates 120 and 122 are generally assembled as a sandwich structure to form the lunette assembly 100. The planar shaped portion of the laminate plates 120 and 122 are generally disposed (positioned) vertically. In one example (not shown), the edges of the laminate plates 120 and 122 may comprise top and bottom surfaces of the assembly 100.

However, in another example (e.g., as shown in FIG. 3), a "Z" shaped plate 110 may be fixed (e.g., fastened, welded, adhered, etc.) to the bottom edges of the laminate plates 120 and 122 to form a bottom surface of the assembly 100. The bottom plate 110 may be implemented as a wear plate to reduce wear of the bottom the tow hitch lunette system 100. The wear plate 110 generally includes a void accommodation aperture that is sized substantially the same as and is aligned with the void 108.

The laminate plates 120 and 122 may have apertures (e.g., holes, slots, and the like) 130 that are traversely (laterally) positioned therethrough. In one example (e.g., holes 130a and 130b), the apertures 130 may be implemented to cooperate such that fasteners such as throughbolts, pins, or the like (not shown, similar to the bolts 16 as shown in FIG. 1) may be installed (e.g., inserted) to hold together (i.e., mechanically couple) the laminate plates 120 and 122.

In another example (e.g., the hole 130c and the slot 130n), the apertures 130 may be implemented and sized such that throughbolts or the like may be snugly installed to mechanically couple the laminate plates 120 and 122 and to cooperate with and mechanically couple the vehicular trailer tow hitch lunette assembly 100 in the mating hitch assembly housing (not shown). Common apertures 130 in the laminate plates 120 and 122 are generally aligned vertically and longitudinally to provide access for installation of the mechanical fasteners (e.g., throughbolts).

As illustrated in FIG. 2 (i.e., as viewed from the top), the laminate plates 120 are generally "U" shaped (i.e., "hairpin" shaped having two legs with a semi-circular region therebetween) to provide the semi-circular ("rounded") end of the section 102 and the outer lateral surfaces of the assembly 100. The "U" shaped portion has a respective cylindrical axis. The semi-circular region of the outer laminate plates 120 and the forward ends of the inner laminate plates 122 comprise the inner void 108 at the first end of the assembly 100 to provide a lunette shaped structure to attach to a complimentary hitch assembly that is adapted to receive the lunette shaped structure 102.

The laminate plates 122 are generally positioned between the legs of the U-shape of the plates 120. The laminate plates 122 are generally singular, substantially flat plates that may be implemented to provide support, stiffness, and additional mechanical strength to the assembly 100.

Figure 4:
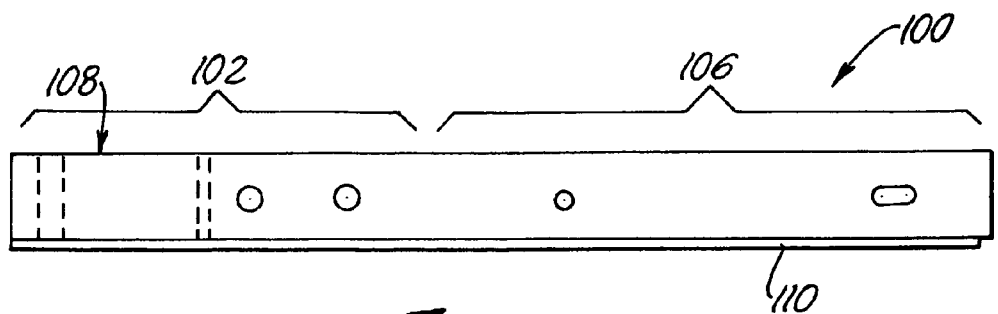
FIG. 4 is a diagram of a side (elevation) view of a tow hitch lunette assembly of an alternative implementation of the present invention.

Referring to FIG. 4, a diagram illustrating a side (elevation) view of an alternative implementation of the tow hitch lunette assembly 100 the present invention is shown. The apparatus 100 may be implemented without an offset section 104 such that the sections 102 and 106 are at substantially the same elevation. That is, the assembly 100 including the respective wear plate 110 when implemented may be substantially flat.

Referring to FIGS. 5A-5E, diagrams illustrating top (plan) views of alternative examples of section 102 of the tow hitch lunette assembly 100 are shown. The apparatus 100 may further comprise a cylindrically shaped hollow lunette insert 140. The insert 140 is generally disposed having a respective cylindrical axis vertical within the void 108 (i.e., parallel to the cylindrical axis of the semi-circular region of the outer laminate plate 120). The insert 140 may provide additional structural strength and uniformity within the void region 108 of the "eye" section 102. The hitch pin or pintle (not shown) that is implemented in connection with the present invention may be placed within the insert 140 to provide the desired mechanical coupling between the tow vehicle and the towed vehicle.

In one example (as shown, for example, in FIGS. 5A, 5B, 5D, and 5E), the lunette insert 140 may be implemented having a cylindrical shape. In one example (as shown, for example, in FIGS. 5A, 5D, and 5E), the laminate plates 122 may be substantially adjacent to the insert 140. In another example (as shown, for example, in FIG. 5B), one or more of the laminate plates 122 may be disposed away from (i.e., not adjacent to) the insert 140.

Figure 5A:
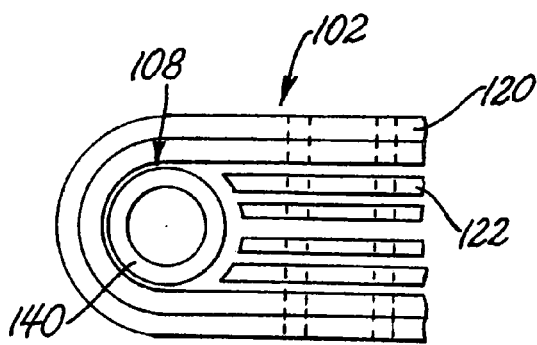
FIGS. 5(A-E) are diagrams of top (plan) views of tow hitch lunette assemblies of alternative implementations of the present invention.
Figure 5B:
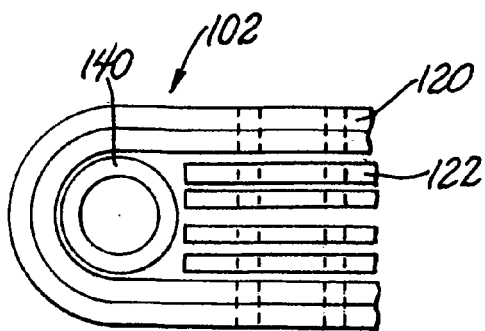
Figure 5C:
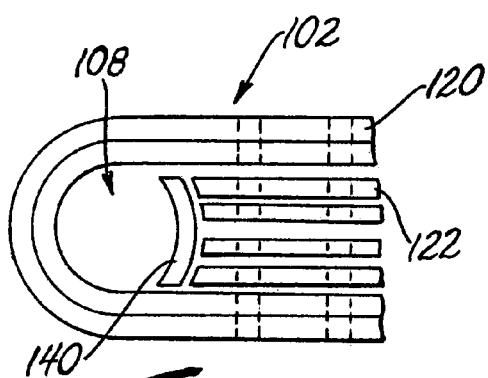
Figure 5D:
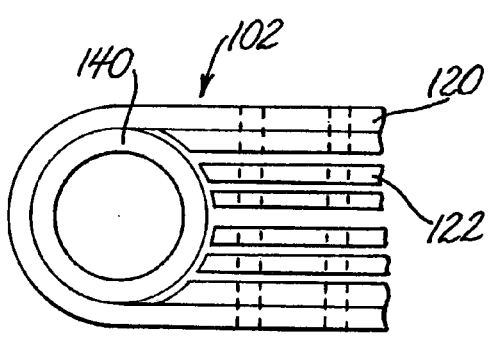

In another example (as shown, for example, in FIG. 5C), the lunette insert 140 may be implemented as an arcuate section (or portion) of a hollow, cylindrically shaped member. The insert 140 as shown in FIG. 5C may be attached to the ends of the laminate plates 122 that form the rearward portion of the void 108.

Figure 5E:
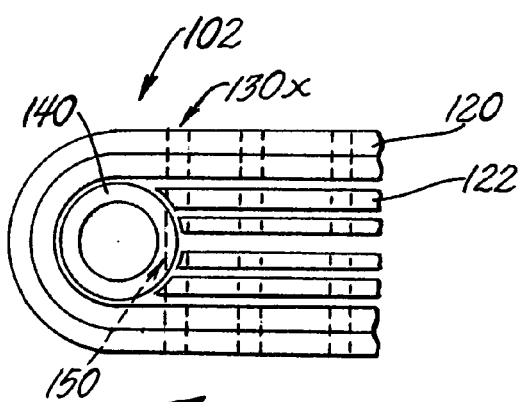
Figure 6:
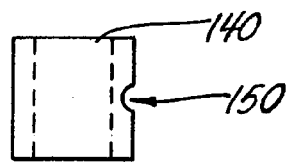
FIG. 6 is a side (elevation) view of an implementation of a lunette insert of the present invention.

In one example (as shown, for example, in FIGS. 5A-5D), the insert 140 may be fastened (retained) inside the void 108 via welding or the like. In another example (e.g., as shown in FIGS. 5E and 6), the insert 140 may have a shaped recess 150 formed in one face of the outer cylindrical surface. The recess 150 is generally shaped and positioned to cooperate with a matching aperture 130 (e.g., aperture 130x) such that a pin, throughbolt, or the like may be implemented to snugly retain the insert 140 within the void 108.

In one example, at least one of the laminate plates 120 and 122, the bottom plate 110, and the insert 140 may be implemented using vanadium steel (i.e., steel alloyed with vanadium for potential improvement in machinability, strength, hardness, and high-temperature stability). In one example, the vanadium steel may be an alloy comprising approximately 0.18 percent vanadium and about 1.00 percent chromium. When heat treated, the vanadium steel may have strength, toughness, and resistance to wear and fatigue which exceed that of conventional alloy steel. At least one grade of the vanadium steel in sheet form may be cold-formed into intricate shapes, folded, and flattened without breaking or exhibiting other failure modes. However, the laminate plates 120 and 122, the bottom plate 110, and the insert 140 are generally implemented using any appropriate materials to meet the design criteria of a particular application.

As is apparent then from the above detailed description, the present invention may provide an improved system for a tow hitch lunette assembly.

Various alterations and modifications will become apparent to those skilled in the art without departing from the scope and spirit of this invention and it is understood this invention is limited only by the following claims.

What is claimed is:

1. For use in a vehicular trailer hitch system, a vehicular trailer hitch lunette assembly, the assembly comprising:

at least one "U" shaped outer laminate plate having two legs with a semi-circular region therebetween;

at least one substantially flat inner laminate plate positioned between the legs of the U-shape of the outer laminate plate to provide support, stiffness, and additional mechanical strength to the assembly, wherein the outer laminate plate and the inner laminate plate have cooperating apertures that are traversely positioned therethrough and the apertures are aligned and sized such that fasteners may be snugly inserted therein to mechanically couple the laminate plates together as a sandwich structure having first and second ends, the semi-circular region of the outer laminate plate and ends of the inner laminate plate comprise an inner void at the first end of the assembly to provide a lunette shaped structure to attach to a complimentary hitch assembly that is adapted to receive the lunette shaped structure, and the second end of the assembly is shaped to mate to a corresponding housing; and a wear plate that is fixed to a surface formed by one set of edges of the outer and inner laminate plates, and the wear plate includes a void accommodation aperture that is sized substantially the same as and is aligned with the void.

2. The assembly of claim 1 further comprising a "Z" shaped offset to provide accommodation of height variation between a tow vehicle and a towed vehicle.

3. The assembly of claim 1 wherein the second end of the assembly is substantially rectangularly shaped.

4. The assembly of claim 1 further comprising a cylindrically shaped hollow lunette insert that is disposed and fastened within the void and having a respective cylindrical axis parallel to the cylindrical axis of the semi-circular region to provide additional strength and uniformity to the void.

5. The assembly of claim 4 wherein the lunette insert has a shaped recess formed in one face of the outer cylindrical surface, and the recess is shaped and positioned to cooperate with a matching one of the apertures to retain the lunette insert within the void.

6. The assembly of claim 1 further comprising an arcuate section of a hollow, cylindrically shaped member to form a lunette insert that is disposed and fastened within the void having a respective cylindrical axis parallel to the cylindrical axis of the semi-circular region and attached to the ends of the inner laminate plates that form the rearward portion of the void to provide additional strength and uniformity to the void.

7. The assembly of claim 1 wherein at least one of the outer laminate plate and the inner laminate plate is implemented using vanadium steel.

8. The assembly of claim 1 wherein the wear plate is implemented using vanadium steel.

9. The assembly of claim 4 wherein the lunette insert is implemented using vanadium steel.

10. The assembly of claim 6 wherein the lunette insert is implemented using vanadium steel.

* * * * *